United States Patent [19]

Wimbush

[11] Patent Number: 4,503,678

[45] Date of Patent: Mar. 12, 1985

[54] RESERVOIRS FOR LIQUID PRESSURE CONTROL SYSTEMS AND A METHOD OF FILLING THE SAME

[75] Inventor: Maurice J. Wimbush, Leamington Spa, England

[73] Assignee: Automotive Products, plc, Leamington Spa, England

[21] Appl. No.: 599,249

[22] Filed: Apr. 11, 1984

Related U.S. Application Data

[63] Continuation of Ser. No. 400,276, Jul. 21, 1982, abandoned, which is a continuation-in-part of Ser. No. 338,165, Jan. 8, 1982, abandoned.

[30] Foreign Application Priority Data

Jan. 21, 1981 [GB] United Kingdom ............... 8101849

[51] Int. Cl.³ .................................... B60T 11/26
[52] U.S. Cl. .................................... 60/584; 60/585; 60/592; 137/854; 188/352; 303/64
[58] Field of Search ............... 188/352; 137/852, 854; 303/64; 60/584, 585, 586, 587, 592

[56] References Cited

U.S. PATENT DOCUMENTS

| | | | |
|---|---|---|---|
| 3,423,939 | 1/1969 | Lewis et al. .................. | 137/852 |
| 3,522,705 | 8/1970 | Wienecke ..................... | 60/587 |
| 4,017,329 | 4/1977 | Larson ......................... | 188/352 |
| 4,415,071 | 11/1983 | Butler .......................... | 188/352 |

FOREIGN PATENT DOCUMENTS

| | | |
|---|---|---|
| 142747 | 11/1981 | Japan ............................. 188/352 |
| 1231449 | 5/1971 | United Kingdom . |
| 1437408 | 5/1976 | United Kingdom . |
| 1539879 | 2/1979 | United Kingdom . |
| 1548669 | 7/1979 | United Kingdom . |

Primary Examiner—Robert E. Garrett
Assistant Examiner—Richard S. Meyer
Attorney, Agent, or Firm—Hauke and Patalidis

[57] ABSTRACT

A liquid reservoir for a hydraulic master cylinder, having a body with a detachable cap for refilling the reservoir, and a diaphragm secured in position by the cap and dividing the reservoir into an air chamber, vented to atmosphere via a hole in the cap and a liquid chamber connected to the master cylinder. An inlet port is provided in the wall of the reservoir for initial charging of the liquid into the liquid chamber without removal of the cap, the port being closed by a plug after the liquid reservoir has been filled. The method of filling a hydraulic control system which has such a reservoir is by the application of vacuum to the system via the inlet port, introducing liquid into the system through the port and subsequently sealing the port with the plug.

5 Claims, 4 Drawing Figures

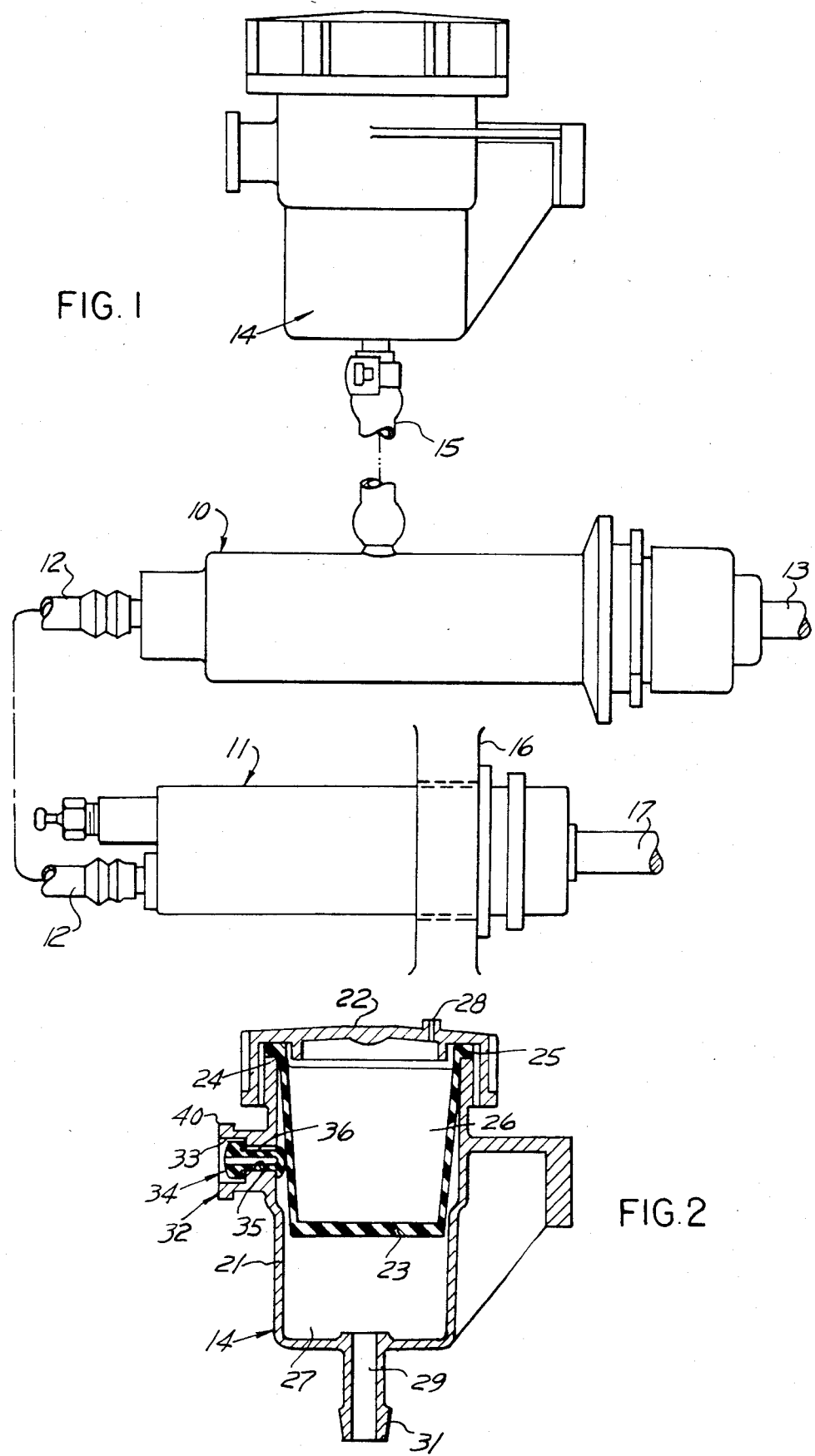

RESERVOIRS FOR LIQUID PRESSURE CONTROL SYSTEMS AND A METHOD OF FILLING THE SAME

CROSS-REFERENCE TO RELATED APPLICATIONS

This application is a continuation of application Ser. No. 400,276 filed July 21, 1982, which is a continuation-in-part of application Ser. No. 338,165, filed Jan. 8, 1982, both assigned to the same assignee as the present application, and now abandoned. This application is related to application Ser. No. 599,248, filed Apr. 11, 1984.

This invention relates to reservoirs for liquid pressure control systems in which a master cylinder is operated to produce a working displacement of a piston in a remote slave cylinder connected thereto by a conduit. The invention is particularly concerned with reservoirs for such systems that are utilized to produce a displacement for the operation of a motor vehicle friction clutch.

In British Pat. No. 1 539 879 there is described a motor vehicle clutch hydraulic control system comprising a hydraulic master cylinder, a reservoir for the master cylinder and a remote hydraulic slave cylinder connected to the master cylinder via a conduit. In order to simplify installation of the control system onto the vehicle the above specification proposes that the control system is assembled, filled with hydraulic fluid and bled before fitting to the vehicle. In the above specification, especially FIGS. 7 to 10, is illustrated a reservoir having a bellows diaphragm located in the reservoir cap to divide the reservoir into an air chamber vented to atmosphere through the cap, and a liquid chamber connected to the master cylinder. In the above reservoir the cap and diaphragm are removed from the reservoir to enable the system to be filled with liquid at the reservoir and bled, at the slave cylinder. Once the filling and bleeding operating has been concluded the diaphragm is inserted into the reservoir.

The removal and replacement of the reservoir cap and diaphragm is time consuming and the replacement can be messy when the reservoir is full of fluid, and total exclusion of air from the system cannot be guaranteed.

SUMMARY

Accordingly there is provided a reservoir for a liquid pressure control system and comprising a reservoir body having a detachable cap for re-charging the reservoir, a diaphragm secured in position by the cap and dividing the reservoir into two chambers, an air chamber vented to atmosphere through the cap, and a liquid chamber connectable to a master cylinder wherein an inlet port is provided in the wall of the reservoir body for initial charging of liquid into the liquid chamber without necessitating the removal of the cap and diaphragm, said port having a closure plug therein for subsequent sealing of the port after the initial charging.

Also according to this invention there is provided a method for filling and bleeding a liquid pressure control system including a reservoir as described above, and having a hydraulic master cylinder, a remote hydraulic slave cylinder connected to the master cylinder via a conduit and said reservoir feeding the master cylinder wherein the method provides for the system to be assembled with the cap and diaphragm in place on the reservoir body vacuum is applied to the system via the reservoir inlet port and the liquid is introduced into the system through said port which is subsequently sealed by the plug.

The invention will be described by way of example and with reference to the following drawings in which:

BRIEF DESCRIPTION OF THE DRAWINGS

FIG. 1 illustrates a liquid pressure control system including a reservoir according to this invention;

FIG. 2 is a section through a reservoir according to this invention;

DETAILED DESCRIPTION OF THE PREFERRED EMBODIMENT

Figure 3:
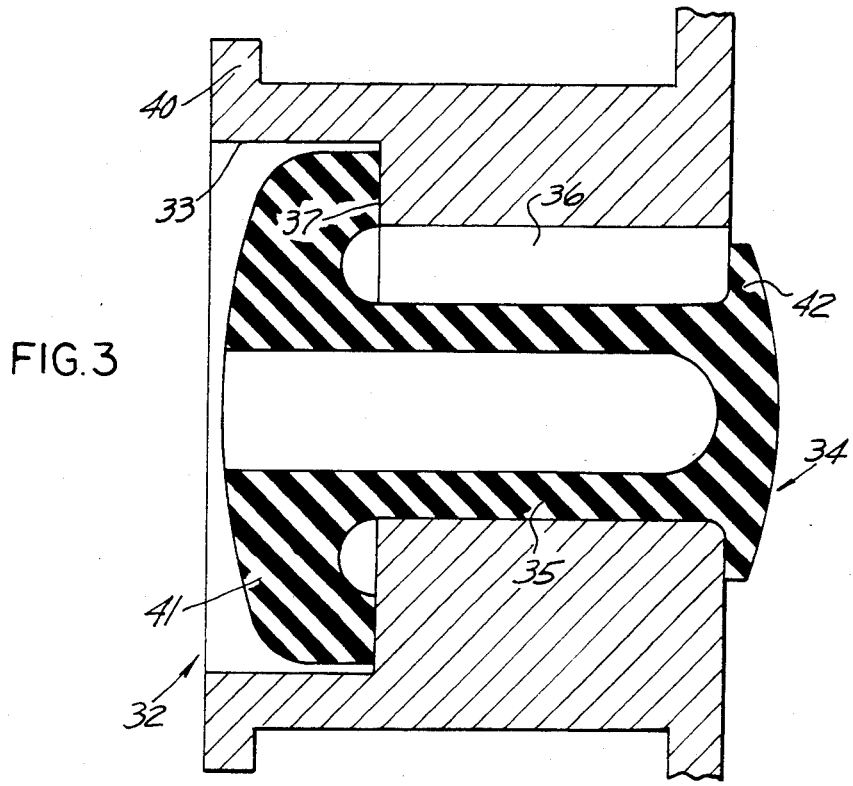
FIG. 3 is an enlarged section through a plug and port as is utilized in the reservoir shown in FIG. 2.

With reference to FIG. 1 of the accompanying drawings, a liquid pressure control system for a motor vehicle clutch comprises a master cylinder 10, a remote slave cylinder 11 connected to the master cylinder 10 by a conduit 12, and a reservoir 14 that is connected to the master cylinder by a conduit 15.

Whilst the reservoir is illustrated as being remote from the master cylinder 10 it could be mounted on the master cylinder if this were required.

The master cylinder 10 is operated by a driver operable push rod 13 to produce a displacement of hydraulic fluid into the slave cylinder 11. The slave cylinder 11 is mounted on, for example, a gearbox bell housing flange 16 and its piston is displaced so as to operate a push rod 17 attached to a clutch release lever (not shown).

As the clutch driven plate (not shown) wears the push rod 17 is moved back into the slave cylinder by the release lever, thereby pushing the slave piston back into the slave cylinder and displacing excess hydraulic fluid back into the reservoir.

With reference to FIG. 2 and FIG. 3 the reservoir 14 comprises a moulded polypropylene reservoir body 21 with a removable cap 22 which screws onto the mouth 24 of the reservoir body 21.

An elastomeric cup shaped diaphragm 23 is secured in position in the reservoir by having its peripheral bead 25 trapped in the reservoir mouth 24 by the cap 22, and divides the reservoir into two chambers, an air chamber 26 and a liquid chamber 27. The air chamber 26 is vented to atmosphere via a port 28 in the cap and the liquid chamber 27 is connected to the master cylinder via a port 29 through a fitting 31 on the bottom of the reservoir body 21.

The reservoir wall of the liquid chamber 27 has an inlet port 32 therein through which during manufacture of the system the liquid chamber 27 can be filled with hydraulic fluid without necessitating the removal of the cap 22 and diaphragm 23 from the mouth 24 of the reservoir. The inlet port 32 has a stepped through bore 33, the smaller diameter portion 35 of which has grooves 36 in the wall thereof that interconnect the inlet chamber 27 with the shoulder 37 of the stepped bore 33. The bore 33 has an elastomeric plug 34 therein for subsequent sealing of the inlet port after filling the reservoir 14. The plug 34 has a circular flange 41 or 42 at each respective end. The outer flange 41 seals against the shoulder 37 of the stepped bore 33, and the inner flange 42 retains the plug 34 in the inlet port but does not close off the grooves 36. The flange 41 is therefore acted upon by hydraulic fluid in the inlet chamber 27. The mouth of the stepped bore is surrounded by an outwardly projecting annular flange 40.

Figure 4:
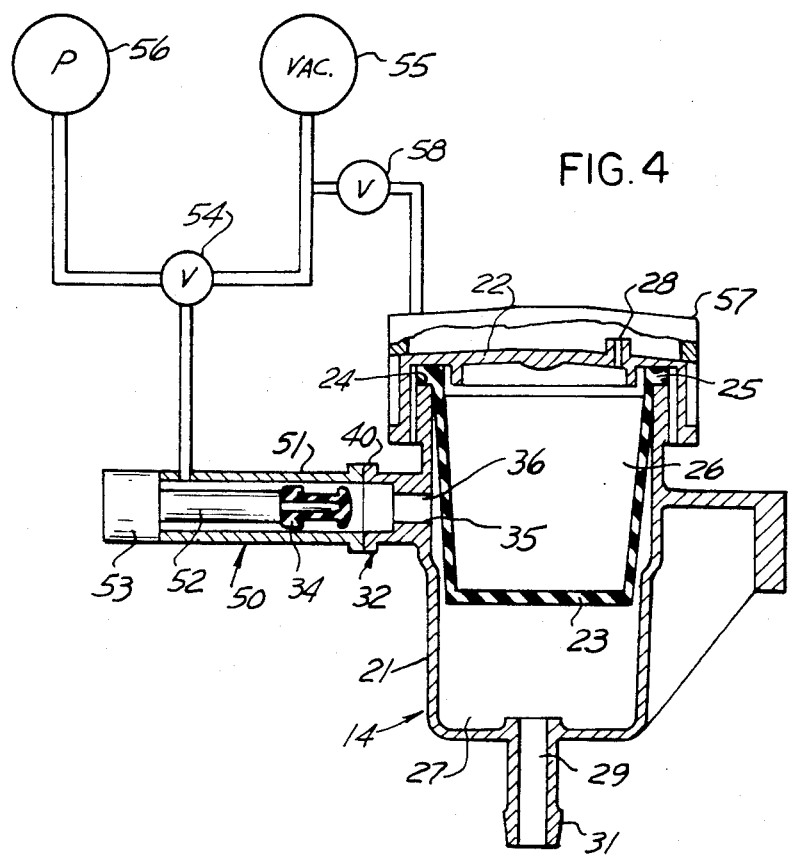
FIG. 4 is a schematic drawing showing a method of filling the control system.

The liquid pressure control system illustrated in FIG. 1 is filled with fluid after assembly of the complete system. In FIG. 4 is schematically illustrated a method of filling the system. A filling jig 50 is fitted on the inlet port 32. The jig 50 includes an external sleeve 51 that seals against the flange 40 on the inlet port and a central plunger 52 on the end of which the plug 34 is fitted. The plunger 52 is moved along the sleeve 51 by an actuator means 53. The jig 50 is connected to a three way valve 54 which is in turn connected to a vacuum source 50 e.g. an air evacuation pump and a hydraulic fluid pump 56. A second jig 57 is sealingly fitted over the reservoir cap 22 and is connected to the vacuum source 55 via a valve 58.

Vacuum is applied to the vent port 28 through the cap 22 to evacuate the air chamber 26 and lift the diaphragm 23 away from the inlet port 32. A check on the vacuum level is made to check the integrity of the diaphragm. The valve 58 then holds the vacuum in the air chamber 26 and the valve 54 is switched to connect the vacuum source 55 with the port 32 to evacuate the control system. The vacuum is applied for a predetermined time period and the vacuum level checked and held to check the integrity of the system. The valve 54 is then switched to cut-off the vacuum source 55 and connect the fluid pump 56 to the port 32. Fluid is now injected into the system at a pressure of 20 p.s.i. and is drawn down into the system by the vacuum therein. Thus the system is filled without removing the cap 22.

The actuator 53 is then operated to push the plug 34 into the stepped bore 33 to seal the inlet port 32.

With the system filled with hydraulic fluid, if there is a build up of a pressure differential between the liquid within the reservoir 14 and the atmosphere outside the reservoir, the pressure of liquid acting on the plug flange 41 causes it to lift away from the shoulder 37 and allows liquid to bleed out of the port 32. The pressure differential at which this occurs can be controlled by the dimensions and material of the plug 34.

The air chamber 26 is of sufficient volume to enable the elastomeric diaphragm 23 to distort to accommodate changes in the volume of fluid in the liquid chamber 27 caused by the displacement of hydraulic fluid to and from the slave cylinder. During servicing of the vehicle on which the control system is fitted the volume of liquid in the chamber 27 may be unnecessarily topped up and the diaphragm 23 distorted on replacement. In such circumstances as the clutch driven plate wears and fluid is displaced back into the liquid chamber 27 of the reservoir 14, the plug 34 allows excess fluid to be vented out of the reservoir. This prevents build up of hydraulic pressure in the system and prevents clutch slip.

Whilst the invention has been described with reference to a clutch control system, it is obvious that such a reservoir could be utilised in hydraulic brake systems which are vacuum bled. In this case the fluid would be injected in through the inlet port at a pressure of 200 p.s.i. (13 bars).

Further it is envisaged that the control system is assembled together and is filled prior to fitting to the vehicle.

I claim:

1. A method of prefilling a hydraulic control system prior to installing said hydraulic control system for normal use, said hydraulic control system comprising a hydraulic master cylinder, a remote hydraulic slave cylinder connected to the master cylinder via a conduit, and a hydraulic fluid reservoir connected to the master cylinder, wherein said reservoir comprises a body having a mouth for replenishing said reservoir with hydraulic fluid, a removable cap normally closing said mouth, a removable diaphragm disposed in said body such as to divide said body into first and second chambers, said diaphragm being held in place by said cap when in position closing said mouth, a vent port in said cap venting said first chamber to atmospheric air, an outlet port and an inlet port in said second chamber, said outlet port placing said second chamber in communication with said master cylinder and said inlet port placing said second chamber in communication with the ambient, said method comprising connecting said system through said vent port in said cap to a source of vacuum for evacuating atmospheric air from said first chamber and for checking the integrity of said diaphragm, subsequently connecting said inlet port to said source of vacuum for evacuating atmospheric air from said second chamber and said system and for checking the integrity of said system, subsequently connecting said inlet port to a source of hydraulic fluid for filling said second chamber and said system with said hydraulic fluid while maintaining said first chamber connected to said source of vacuum, disconnecting said inlet port from said source of hydraulic fluid and said first chamber from said source of vacuum, and sealing said system from the ambient by closing said inlet port by means of a plug, said inlet port and said plug being so constructed as to allow flow of hydraulic fluid from said second chamber to the ambient upon excess hydraulic fluid pressure in said second chamber and prevent reverse flow from the ambient into said second chamber.

2. The method of claim 1 wherein said hydraulic control system is a motor vehicle clutch release mechanism.

3. A method of initially charging a hydraulic fluid control system with hydraulic fluid, said hydraulic fluid control system comprising a hydraulic master cylinder, a remote hydraulic slave cylinder connected to the master cylinder via a conduit, and a reservoir of hydraulic fluid feeding the master cylinder, said reservoir comprising a reservoir body having a mouth, a detachable cap mounted on the mouth of the body and removable for replenishing the reservoir with hydraulic fluid, a diaphragm secured in position by said cap and removable for replenishing the reservoir with hydraulic fluid, said diaphragm dividing the reservoir body into two chambers, one of said chambers being an air chamber vented to atmosphere through an aperture in the cap and the other of said chambers being a hydraulic fluid chamber containing hydraulic fluid and connectable to the master cylinder, an inlet port defined in a wall of the reservoir body for the initial charging of hydraulic fluid into the hydraulic fluid chamber without necessitating the removal of the cap and diaphragm, and a closure plug located in the inlet port for subsequent sealing thereof after the initial charging, wherein the inlet port and the closure plug are so constructed and arranged as to allow excess hydraulic fluid in the hydraulic fluid chamber to exit the reservoir past the closure plug when a predetermined pressure differential exists across the closure plug, said method comprising applying vacuum to the system via the inlet port, introducing hydraulic fluid into the system via the inlet port, and subsequently sealing the system by installing the plug in the inlet port, said inlet port and said plug being arranged in assembly to allow the hydraulic fluid to flow through the assembly from the hydraulic fluid chamber to ambient upon excessive hydraulic fluid pressure in the hydraulic fluid chamber.

4. The method of claim 3 further comprising the steps of applying vacuum to said hydraulic fluid chamber through said aperture in the cap prior to applying vacuum to the system, and checking the integrity of the diaphragm while vacuum is applied to said air chamber.

5. The method of claim 4 further comprising the step of maintaining vacuum applied to said air chamber while introducing hydraulic fluid into the system, and cutting off application of vacuum to said air chamber prior to installing the plug in the inlet port.

* * * * *

UNITED STATES PATENT AND TRADEMARK OFFICE
CERTIFICATE OF CORRECTION

PATENT NO. : 4,503,678

DATED : March 12, 1985

INVENTOR(S) : Maurice John Wimbush

It is certified that error appears in the above-identified patent and that said Letters Patent are hereby corrected as shown below:

Column 3, line 13, change "50" to --55--.

Signed and Sealed this

Twenty-fifth Day of June 1985

[SEAL]

Attest:

DONALD J. QUIGG

Attesting Officer     Acting Commissioner of Patents and Trademarks